May 28, 1968  M. DAVIS  3,385,038
FILTERS

Filed June 21, 1965  3 Sheets-Sheet 1

INVENTOR
Maurice Davis

BY *Holcombe, Wetherill & Brisebois*
ATTORNEY

INVENTOR
Maurice Davis

United States Patent Office 3,385,038
Patented May 28, 1968

3,385,038
FILTERS
Maurice Davis, Mead Works, Parsons Mead,
Croydon, England
Filed June 21, 1965, Ser. No. 465,648
Claims priority, application Great Britain, June 24, 1964,
26,219/64
2 Claims. (Cl. 55—484)

ABSTRACT OF THE DISCLOSURE

A filter element comprising a cylindrical corrugated peripheral wall of cellular resilient material, end members of the same material at each end of the corrugated wall, an inner support for the corrugated wall and an outer housing, said end members being squeezed between the inner support and outer housing.

---

This invention is concerned with improvements in and relating to filters, and more especially to filters for gases, such as air.

It is an object of the invention to provide a simple robust filter construction which is particularly suited to filtering gases in connection with their use in machines such as compressors and internal combustion engines, for example, the air-intake to such machines.

According to the present invention there is provided a filter element comprising a corrugated peripheral wall of porous resilient material and end members of porous resilient material secured to the edge faces of said peripheral wall and each defining an aperture communicating with a space surrounded by said peripheral wall.

The end members may each form a flange to be received between an element support and a surface being one of the surfaces defining the passage to be followed by the fluid.

The porous resilient synthetic plastics material may be formed from a foamed cellular synthetic plastics material of which the cell walls have been ruptured.

The element may comprise a permeable support adjacent the radially inner or outer face of the peripheral wall and may include end faces against which the end member flanges may seat. Furthermore the support may include means for supporting the corrugations in the peripheral wall, which are received in the inwardly or outwardly facing recesses respectively of the peripheral wall.

The peripheral wall may be annular and the permeable support and the corrugation support means are adapted to maintain the form of the peripheral wall during its use in filtering.

In one form, the permeable support end faces may be formed by lips along opposite side edges so that both end members may be engaged against a respective lip and the corrugation supporting means can be retained against axial movement between the lips.

A number of filters according to the invention may be used together, with an end member of one element sealingly pressed against an end member of another element so that gas cannot be passed between the end members.

In the case where the peripheral wall is in the form of a closed figure each of the end members then being annular and defining an aperture communicating with a space surrounded by the peripheral wall, means may be provided which can sealingly engage against one of the end members to close the respective aperture, while apertured means may be provided which can sealingly engage against the other end member without closing the aperture defined thereby, the apertured means defining a conduit for gas, so that gas can only pass between the exterior and the conduit through the porous resilient synthetic plastics material, which can then filter solids therefrom.

Features and advantages of the present invention will appear from the following description of embodiments thereof, given by way of example only, reference being had to the accompanying drawings in which.

Figure 1:
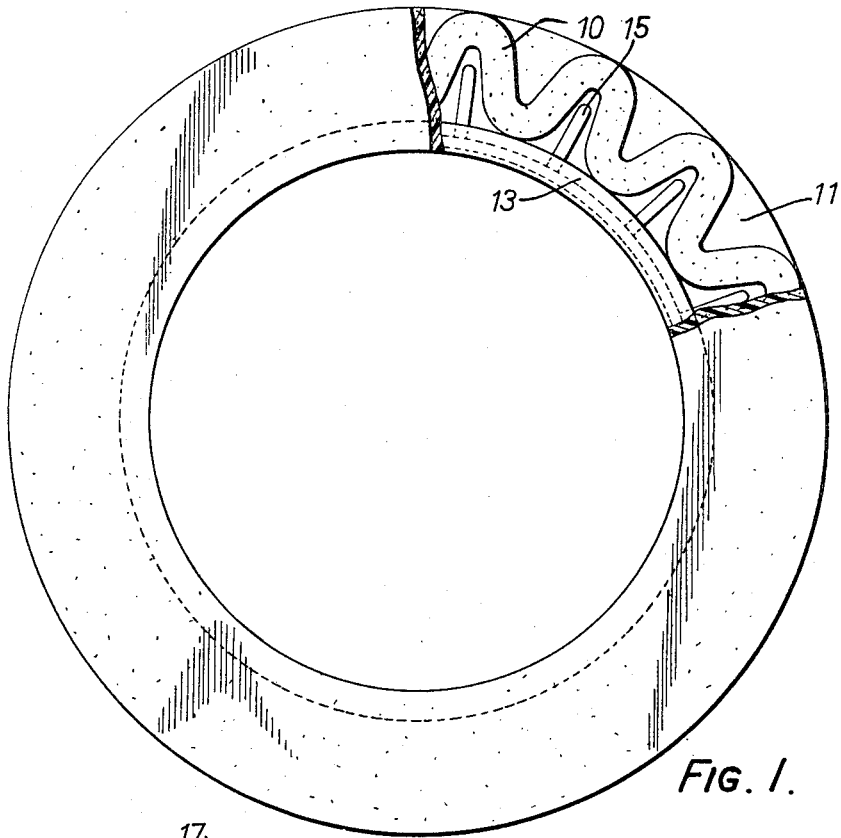
FIGURE 1 is a part sectioned end view of an air filter element according to one embodiment of the invention.
Figure 2:
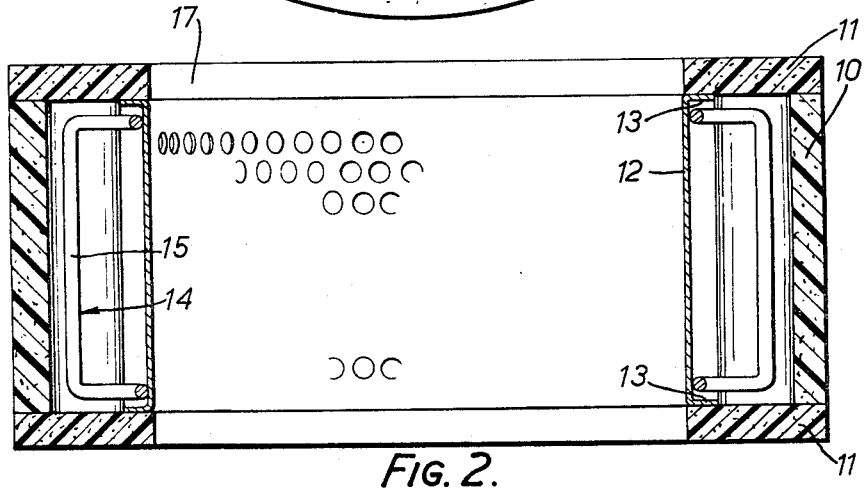
FIGURE 2 is an axial cross section of the filter of FIGURE 1.

Referring first to FIGURES 1 and 2, the air filter comprises a peripheral wall 10 of foamed resilient synthetic plastics material, the cell walls of which have been ruptured. The wall 10 is corrugated and generally in the form of an annulus, the end faces of the wall 10 being secured, for example by adhesive, to annular end members 11 of the same material, which project radially inwardly of the wall 10 to form end flanges.

Figure 4:
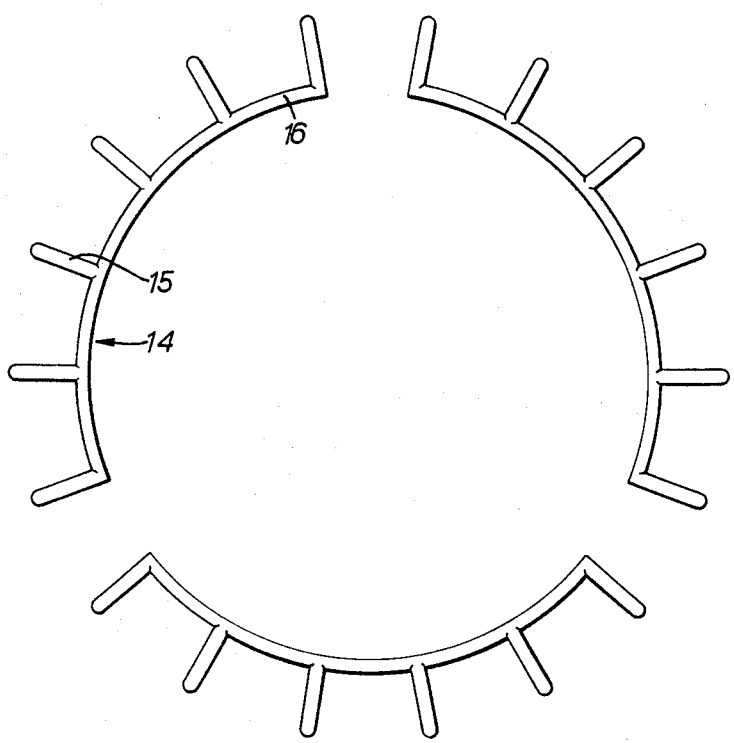
FIGURE 4 is a view in the axial direction of corrugation supports used in the embodiments of FIGURES 1 to 3.

A permeable support 12 extends adjacent the wall 10 and spaces the end members 11 by means of radially out-turned lips 13 against which the flanges of the end member 11 engage. Between the lips 13 and outwardly of the permeable support 12 are disposed corrugation supports indicated by 14. By reference to FIGURES 2 and 4, the corrugation supports 14 are seen to be formed from a number of U-shaped wires 15 which are received in the outwardly recessed portions of wall 10, and which are fixedly located relative to each other by part circular pairs of wire portions 16 attached at the ends of the limbs. While FIGURE 4 illustrates a corrugation support 14 formed from three pairs of wire portions 16, each pair with its respective wires 15, it is to be understood that any number of portions 16 may be employed. The corrugation supports could be of other constructions such as mouldings of plastics material.

In order to use the filter of FIGURES 1 and 2, the aperture 17 defined by, for instance, the top end member 11, is closed by suitable means such as a plate (not shown) which is arranged to sandwich the flange of the member 11 between the plate and the top lip 13, and pressed toward the top lip so that a gas to be filtered cannot pass between the plate and the end member 11 or between the lip 13 and the end member 11. An annular part (not shown) is disposed so as to sandwich the flange of the lower end member 11 between the annular plate and the lower lip 13 and pressed toward the lower lip 13 so that gas cannot pass between the part and the member 11 or between the lower lip 13 and the member 11, while the part is arranged so as to provide a gas path from the interior of the filter. Thus, if the annular part forms the air-intake to an air-breathing machine, air can only be sucked into the air-intake by passage through the wall 10 and the end members 11, being filtered during such passage.

Figure 3:
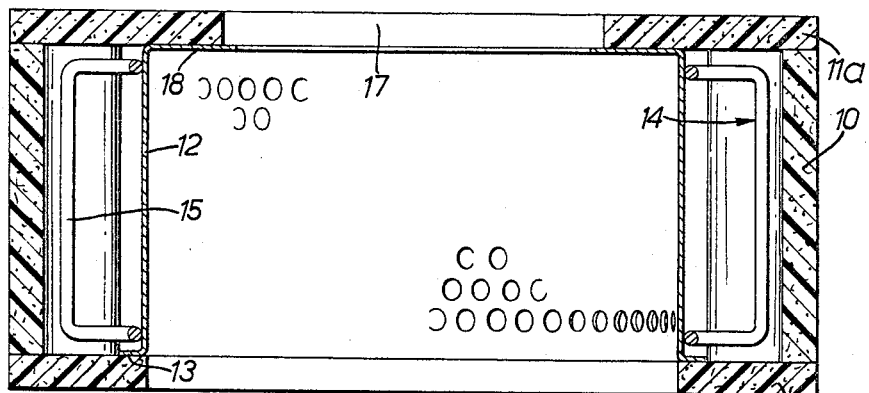
FIGURE 3 is an axial cross section of another embodiment of the invention.

The embodiment of FIGURE 3 has a corrugated peripheral wall 10 of porous synthetic resilient plastics material generally in the form of an annulus with end members 11a and 11b. As viewed in FIGURE 3, end member 11a is uppermost and is seen to be of inwardly greater radial extent than end member 11b. A permeable support 12 extends adjacent the wall 10 and is formed at the lowermost end with an outwardly turned lip 13 and at the uppermost end with an inwardly turned flange 18. The lip 13 and the flange 18 space respective end members 11b, 11a. A corrugation support 14, identical with that of FIGURES 1, 2 and 4 is disposed around the permeable support 12, the U-shaped wires 15 being received in the outwardly recessed portions of wall 10, as before.

The embodiment of FIGURE 3 is used in an identical manner to that of FIGURES 1 and 2, but presents the advantage that the wall 10 with end members 11 and the corrugation support 14, may be removed more easily from their position relative to the permeable support 12 by virtue of the absence of one of the outwardly turned lips 13, the gas sealing function of which in the FIGURE 3 embodiment is assumed by flange 18 instead. Thus, the resilient porous synthetic plastics parts and the corrugation supports 14 can be axially removed upwardly as seen in FIGURE 3 while the lower lip 11b need negotiate only lower lip 13 instead of the two lips 13 of the other embodiment, and no obstacle is presented to corrugation supports 14 by lips 13.

A number of filters such as those illustrated may be used in combination with an end member 11 of one in sealing contact with an end member 11 of another filter, the aperture 17 at one end of the combination being closed as previously described, while the aperture at the other end is arranged to form part of a gas conduit as previously described.

Figure 5:
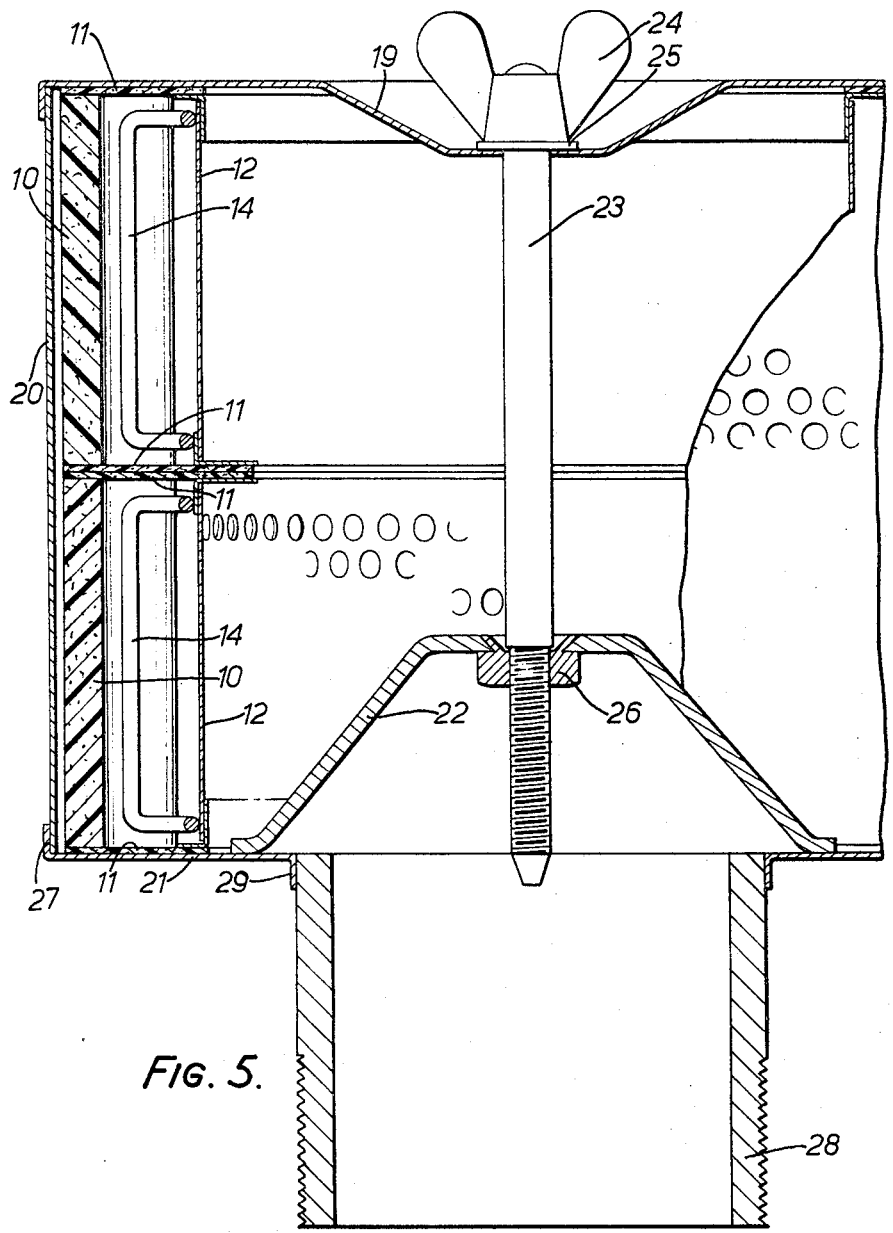
FIGURE 5 is an axial cross section of two filter elements within a housing.

Such a multiple filter element construction is shown in FIGURE 5, in which two of the filter elements illustrated in FIGURE 3 are abutted end-to-end within a housing comprising an end closure plate 19, a perforated external sleeve member 20 and an apertured end plate comprising an annular flanged member 21 attached to a dished apertured spider member 22 carrying a threaded bush 26 which can receive a threaded end of a clamping bolt 23. The other end of the bolt 23 is also threaded and passes through a central aperture in the plate 19, which in turn is secured by a wing nut 24 and washer 25 threadedly engaging the bolt 22. The sleeve member 20 and the annular end member 21 may be spot welded together at 27, and an inlet pipe 28 for the compressor may be attached to a flange 29 of the annular member 21.

It will be seen from FIGURE 5 that the end members 11 are squashed virtually flat when the nut 24 is fully tightened, thus ensuring a gas-tight seal between the end members 11 and the closure members 19 and 21.

By increasing the length of the bolt 23 and the sleeve member 20, three or even more filter elements may be abutted end-to-end within the housing, to give a filter assembly of any desired capacity.

The housing construction described above for use with a multiple-element filter assembly may, given a suitable length of the sleeve member 20 and bolt 23, be conveniently used as a housing for a single filter element.

Both the external housing and the internal permeable supports could be of moulded plastics material if desired.

In a modification, the permeable support 12 may comprise a number of sections which can interlock by means of tongues and grooves.

It will be understood that whilst the filters described and illustrated are particularly suitable for use in the case where gas enters radially inwardly through the element and leaves axially thereof, the invention comprehends a filter for use in the case where gas enters the filter axially and leaves radially.

In such an arrangement the corrugated peripheral wall 10 would be disposed radially inwardly of the corrugation supports 14, and the permeable support 12 respectively. Where it is intended that the filter be useful for both cases of gas flow, permeable supports 12 and corrugation supports 14 could be provided on both sides of the corrugated wall 10. In all cases the end members 11 have their flanges arranged to be sealingly compressed against corresponding lips of the permeable support members.

What I claim is:

1. A filter comprising a housing having an annular permeable wall, and end walls one of which defines a port and one of which is in the form of a removable cover, an annular permeable support inside and coaxial with the annular wall and surrounding the port, and a filter element having a corrugated wall lying between the annular wall and the support and having end pieces fast with the corrugated wall extending radially inward thereof and each clamped between the permeable support and an end wall, the filter element being of permeable cellular synthetic plastic material, and a plurality of removable support members between said annular support and filter element, each support member subtending an arcuate part of the corrugated wall, being individually separable from said annular support and having a plurality of radially projecting means engaging corrugations of the filter element.

2. A filter according to claim 1 in which there are a plurality of filter elements, one end piece of one end filter element being clamped between the permeable support of that element and an end wall and the other end piece being clamped between the permeable support and an end piece of another filter element.

References Cited

UNITED STATES PATENTS

| | | | |
|---|---|---|---|
| 2,220,706 | 11/1940 | Cantin | 55—521 X |
| 2,966,960 | 1/1961 | Rochlin | 55—502 |
| 2,985,307 | 5/1961 | Grasmere et al. | 210—493 X |
| 3,183,286 | 5/1965 | Harms | 55—497 X |
| 3,290,870 | 12/1966 | Jensen | 55—498 X |

FOREIGN PATENTS

| | | |
|---|---|---|
| 329,099 | 5/1930 | Great Britain. |
| 856,686 | 12/1960 | Great Britain. |
| 936,777 | 9/1963 | Great Britain. |
| 1,159,447 | 2/1958 | France. |

SAMIH N. ZAHARNA, *Primary Examiner.*

R. FRIEDMAN, *Examiner.*

C. DITLOW, *Assistant Examiner.*